July 15, 1924.
P. J. DARLINGTON
1,501,164
MEANS FOR STORING STANDARD MEASURING DEVICES
Filed Oct. 6, 1923  2 Sheets-Sheet 2
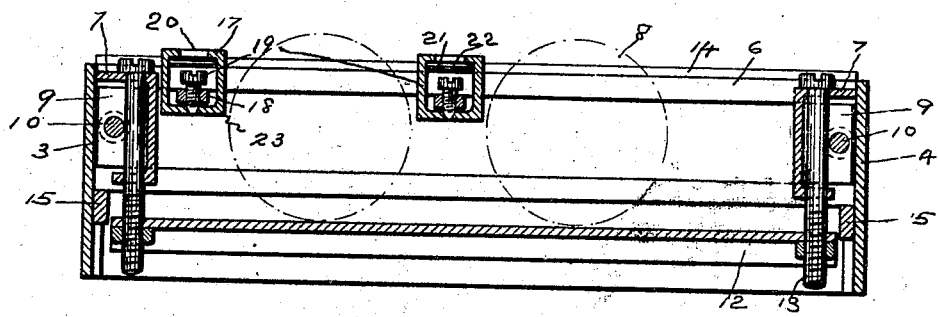
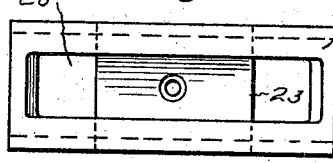
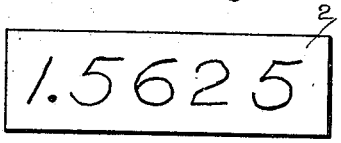
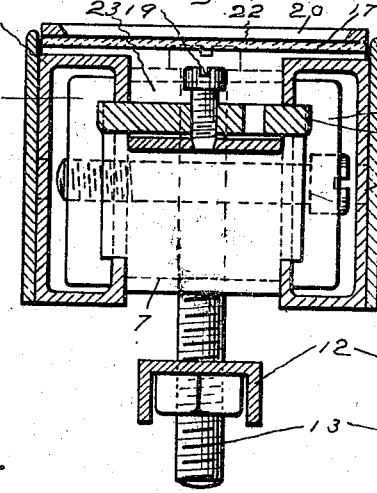
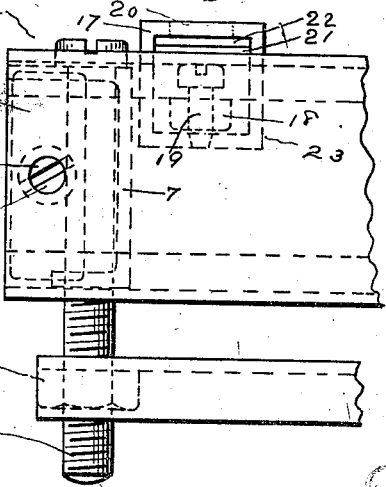
INVENTOR.
Philip J. Darlington
BY
Harry R. Williams
ATTORNEY.

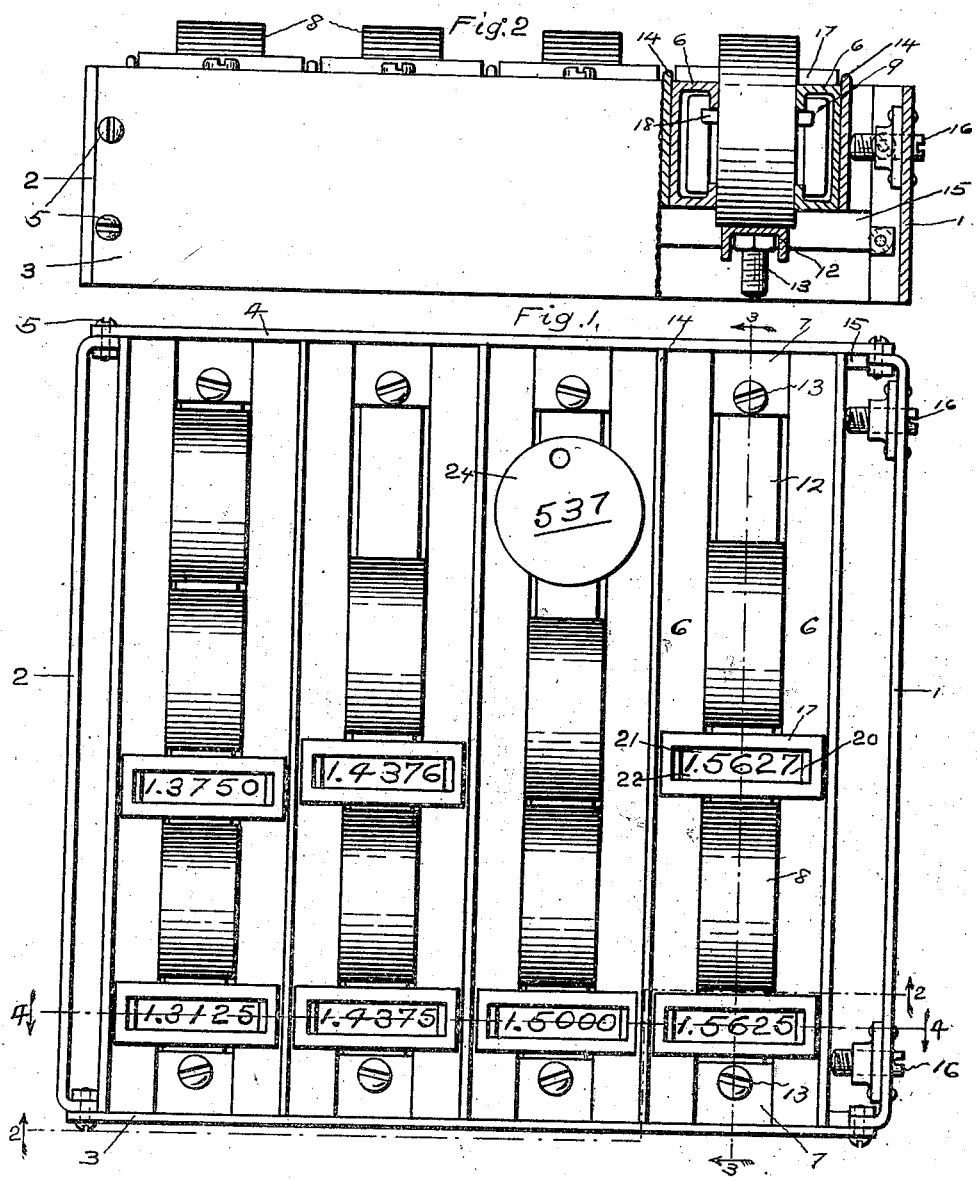

Patented July 15, 1924.

1,501,164

UNITED STATES PATENT OFFICE.

PHILIP J. DARLINGTON, OF BOSTON, MASSACHUSETTS.

MEANS FOR STORING STANDARD MEASURING DEVICES.

Application filed October 6, 1923. Serial No. 667,059.

*To all whom it may concern:*

Be it known that I, PHILIP J. DARLINGTON, a citizen of the United States, residing at Boston, in the county of Suffolk and State of Massachusetts, have invented a new and useful Improvement in Means for Storing Standard Measuring Devices, of which the following is a specification.

This invention relates to a structure adapted for the tool room of a machine shop or engineering establishment, which is designed to receive and store gages or standard size blocks.

The object of the invention is to provide a simple and convenient structure for such purpose which will protect the gages placed therein from accidental injury, and retain them in such manner that the several sizes may be readily identified and the desired size quickly removed when wanted for service by an engineer or workman, the structure being formed in separable units so put together that its capacity can be easily extended as the number of gages are increased.

This object is attained by providing a frame, desirably made so that its capacity may be increased, in which one or more, usually more, gage-receiving units are removably located, each unit comprising a pair of side rails detachably fastened together and spaced to receive the gages, with a bottom rail that may be elevated or lowered for supporting the gages placed between the side rails, and one or more carriages for receiving size identifying cards adjustably clamped to the side rails. The gages are placed in progressive series according to size between the side rails on the bottom rail and the card carriages set adjacent to the gages to indicate the various sizes.

In the accompanying drawings Fig. 1 is a plan of a device embodying the invention showing cylindrical gages or reference disks in storage and a workman's identification tool-check in the place of a gage which has been issued to him. Fig. 2 is a front elevation with part cut in section on the dotted line 2—2 on Fig. 1. Fig. 3 is a vertical section of the device on the dotted line 3—3 on Fig. 1. Fig. 4 is a vertical section, on larger scale, taken on the dotted line 4—4 of Fig. 1, of one storage unit with two division strips. Fig. 5 is an elevation of one end of a storage unit. Fig. 6 is a plan, on enlarged scale, of an identification card carriage. Fig. 7 shows an identification card adapted to be inserted into the card carriage.

The frame illustrated is composed of flanged end plates 1 and 2, with front and rear plates 3 and 4 detachably fastened to the flanged ends of the end plates by screws 5. In order to extend the frame when desired to increase its capacity the screws are removed and longer front and rear plates substituted.

Each gage-supporting unit is composed of a pair of internally flanged side rails 6 assembled flange to flange with spacing plates 7 at the ends separating them a distance which is approximately the thickness of the gages 8 to be stored, the gages illustrated being standard size circular disks. The rails are fastened together by clamp blocks 9 and transversely extending screws 10 arranged in the rails at their ends. Holes 11 are made through the outer webs of the side rails to permit access to the slotted heads of the clamp screws. The distance apart of the rails is determined by the width of the spacing plates which may be varied in width according to the thickness of the gages to be placed in the device. A channel-shaped supporting rail 12 is adjustably suspended below the opening between the side rails by vertically arranged screws 13 which pass through the spacing plates. By turning these screws the supporting rail may be raised or lowered to bring the tops of the gages a distance above the tops of the side rails to permit of their convenient removal. These units are assembled in the frame side by side with division strips 14 between them and their ends resting upon cleats 15 attached to the inside of the front and rear frame plates. Screws 16 of suitable length are threaded through one of the end plates and turned against one of the division strips for clamping the several units and division strips in place in the frame.

Mounted on each gage-receiving unit are one or more card-receiving carriages 17. Each carriage has a central tubular portion 23 that extends down between and loosely fits the side rails. This portion of the carriage contains a clamp plate 18 provided with a set screw 19 that is threaded through the clamp plate and adapted to be turned against the bottom of the tubular portion of the carriage so as to force the clamp plate upwardly against the flanges of the side rails and thus hold the carriage in the position to which it is adjusted. When the clamp plate is loosened the carriage may be slipped along the rails and when the screw is removed the clamp plate may be manipulated so as to release the carriage and permit its removal from the side rails. The carriages have windows 20 in the top, and identification cards 21 with numerals designating the sizes of the gages are slipped lengthwise into the carriages so that they may be read through the windows. Transparent covers 22 may be slipped into the carriages over the cards to keep them from becoming soiled. The division strips between the adjacent units are preferably of such height that they will cover the ends of the openings through the carriages and thereby prevent the cards from becoming displaced.

When in use the gages are desirably arranged between the rails in order of their increased sizes from front to rear in each unit and from left to right in the adjacent units. A carriage containing a card with the correct numerals is clamped to the side rails in front of each size of gage. The supporting rails are adjusted to different heights so as to bring the tops of the gages high enough to allow them to be easily grasped and lifted out by their flat and unfinished faces, the supporting rails of each unit preferably being level so that it can be readily seen whether or not the gages are arranged in correct sequence. As the units become filled more units may be added to accommodate additional gages and when the frame becomes filled with units the front and rear plates may be removed and longer front and rear plates substituted. When a gage is issued to a workman his identification check 24 is placed on the rails over the space from which the gage has been removed and the gage cannot be replaced or another gage put in the same place until the check has been removed.

The invention claimed is:—

1. Means for storing standard measuring devices comprising a frame, and units, each consisting of a pair of side rails fastened together with a space between them and a supporting rail suspended below the space between the side rails, mounted in the frame.

2. Means for storing standard measuring devices comprising a frame, and units, each consisting of a pair of side rails fastened together with a space between them and a supporting rail suspended below the space between the side rails, removably mounted and clamped in the frame.

3. Means for storing standard measuring devices comprising a frame, and units, each consisting of a pair of side rails fastened together with a space between them, a supporting rail suspended below the space between the side rails, and identifying card carriages adjustably mounted on the side rails, clamped in the frame.

4. Means for storing standard measuring devices comprising a frame consisting of end, front and rear plates detachably secured together, and units, each consisting of a pair of side rails fastened together with a space between them and a supporting rail suspended below the space between the side rails, mounted in said frame.

5. Means for storing standard measuring devices comprising a frame, and units, each consisting of a pair of side rails fastened together with a space between them and a supporting rail suspended below the space between the side rails, mounted in the frame, division strips, and means clamping said units and strips in the frame.

6. Means for storing standard measuring devices comprising a frame, and units, each consisting of a pair of side rails fastened together with a space between them, a supporting rail suspended below the space between the side rails, and means for raising and lowering said supporting rail, mounted in the frame.

7. Means for storing standard measuring devices comprising a frame, and units, each consisting of a pair of side rails, spacing plates separating the side rails, means clamping the spaced side rails together and a supporting rail suspended below the space between the side rails, mounted in the frame.

8. Means for storing standard measuring devices comprising a frame, and units, each consisting of a pair of internally flanged side rails fastened together with a space between them, a supporting rail suspended below the space between the side rails, and identifying card carriages adjustably attached to said flanged side rails, clamped in the frame.

9. Means for storing standard measuring devices comprising a frame consisting of end, front and rear plates detachably secured together, and units, each consisting of a pair of side rails, fastened together with a space between them and a supporting rail suspended below the space between the side rails, mounted in said frame, and screws turned through one end plate and clamping said units in the frame.

10. Means for storing standard measuring devices comprising a frame, and units, each consisting of a pair of side rails fastened together with a space between them, a supporting rail suspended below the space between the side rails, and identification card carriages clamped in said side rails, mounted in the frame, division strips separating said units and closing the ends of said carriages, and means clamping said units and strips in the frame.

PHILIP J. DARLINGTON.